United States Patent [19]

Iwasaki

[11] 4,393,363  
[45] Jul. 12, 1983

[54] MAGNET BASE FOR TOOL  
[75] Inventor: Hiroshi Iwasaki, Tokyo, Japan  
[73] Assignee: Fuju Jiko Kabushiki Kaisha, Tokyo, Japan  
[21] Appl. No.: 264,442  
[22] Filed: May 18, 1981  
[51] Int. Cl.³ .............................................. H01F 7/20  
[52] U.S. Cl. ..................................... 335/288; 335/302  
[58] Field of Search ............... 335/285, 286, 287, 298, 335/288

[56] References Cited  
U.S. PATENT DOCUMENTS

| 2,280,437 | 4/1942 | Levesque | 335/295 |
| 3,142,787 | 7/1964 | Levesque | 335/287 X |
| 3,812,629 | 5/1974 | Campbell | 335/287 |
| 4,251,791 | 2/1981 | Yanagisawa et al. | 335/285 |

FOREIGN PATENT DOCUMENTS

| 449705 | 11/1944 | Canada | 335/285 |
| 847394 | 9/1960 | United Kingdom | 335/295 |

Primary Examiner—George Harris  
Attorney, Agent, or Firm—Kenyon & Kenyon

[57] ABSTRACT

A magnet base for a tool, comprises: a yoke made up of two symmetrical parts which form a cylindrical hole; a cylindrical magnet made of ferrite material which is rotatably inserted in the cylindrical hole; and a handle unit engaged with the magnet to turn the latter so that the magnet base is placed in magnetically active state and in magnetically inactive state.

6 Claims, 8 Drawing Figures (a) OFF (b) ON

MAGNET BASE FOR TOOL

BACKGROUND OF THE INVENTION

This invention relates to magnet bases for various magnet type measuring tools and magnet type auxiliary tools.

Various magnetic tools, such as dial gauges and magnet holder type marking-off tools used in machining operations on grinding machines, lathes, milling machines, etc., are used with being magnetically attracted to the tables of these machines, work-pieces, or surface tables. In this connection, there is a tendency that the magnet in the base of such a magnetic tool is made of ferrite material low in cost instead of so-called "alnico-V" series material. However, the ferrite material is low in magnetic flux density and accordingly in magnetic force, when compared with the "alnico-V" series material. In order to overcome this difficulty, a variety of methods have been proposed in the art in which the dimensions of the magnet, i.e. the sectional area of the latter is increased to compensate the insufficient magnetic force due to the low magnetic flux density.

A magnet base of this type has a yoke with a cylindrical hole, and a magnet which is slidably and rotatably inserted into the cylindrical hole of the yoke. In a magnet base using a magnet made of the "alnico-V" series material, the magnet is shaped as shown in FIG. 4. More specifically, the configuration of the sectional area of the magnet is such that the cylindrical hole of the yoke is not completely filled with the magnet; i.e. the configuration of the magnet is such that a cylinder is cut by two parallel planes along its longitudinal axis, so that two cylindrical walls and two parallel walls are left. Accordingly, the two cylindrical walls are slidably rotated in the cylindrical hole of the yoke. This configuration is advantageous in maintaining N and S poles for the magnet. Accordingly, in the case where the "alnico-V" series material which is high in magnetic flux density and tolerable in sectional area design is used to fabricate the magnet, the magnet comes to have the configuration which is obtained by cutting a cylinder as described above without minding the reduction of the sectional area.

On the other hand, in the case where the ferrite material is used to fabricate the magnet, the fact that it is relatively low in magnetic flux density must be taken into account. Accordingly, in designing, it is required to compensate the insufficient magnetic force by making the sectional area of the magnet as large as possible.

SUMMARY OF THE INVENTION

Accordingly, an object of this invention is to provide a magnetic base for a tool, which satisfies the above-described requirement.

More specifically, an object of this invention is to provide a magnetic base for a tool, in which although its magnet is made of ferrite material relatively low in magnetic flux density, it has a sufficiently strong magnetic force.

Another object of the invention is to provide a magnetic base for a tool, which, after being switched to be in active state, is protected from being switched back to be in inactive state by an external force which is carelessly applied thereto.

In a magnet base provided according to the invention, a magnet which is slidably and rotatably inserted in the cylindrical hole of a yoke is completely circular so that it fully occupies the cylindrical hole of the yoke, thereby to maximize the sectional area of the magnet, and a handle unit for turning the magnet is so designed that it will not reduce the sectional area of the magnet.

The foregoing objects and other objects as well as the specific features of the invention will become more apparent from the following detailed description and the appended claims when read in conjunction with the accompanying drawings.

Figure 2:
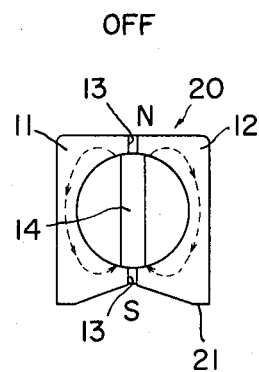
Figure 2:
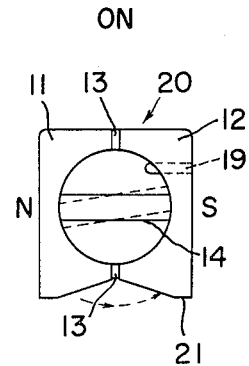
Figure 3:
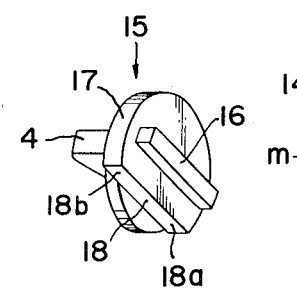
Figure 3:
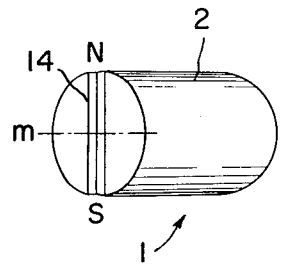
Figure 3:
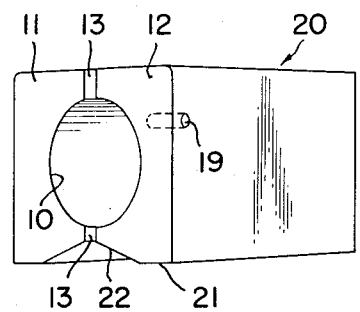
Figure 4:
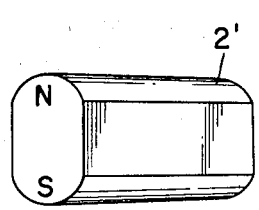
Figure 5:
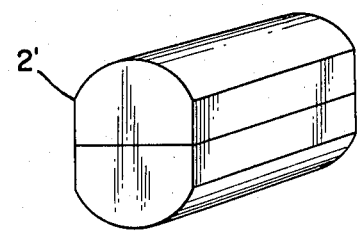
Figure 6:
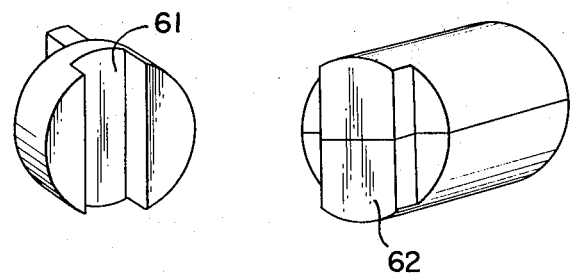
Figure 7:
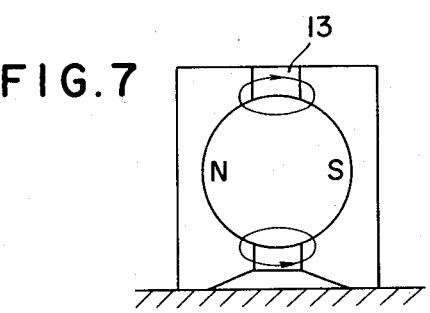

The parts (a) and (b) of FIG. 2 are front views showing a part of the magnet base according to the invention;

FIG. 3 is an exploded perspective view of the magnetic base according to the invention;

FIG. 4 is a perspective view of a magnet in a conventional magnet base;

FIG. 5 is a perspective view of a magnet in another example of the magnet base according to the invention;

FIG. 6 is an exploded perspective view of a handle unit and a magnet in a third example of the magnet base according to the invention; and FIG. 7 is a front view of a fourth example of the magnet base according to the invention, which is attracted for instance, to a surface table.

DETAILED DESCRIPTION OF THE INVENTION

Figure 1:
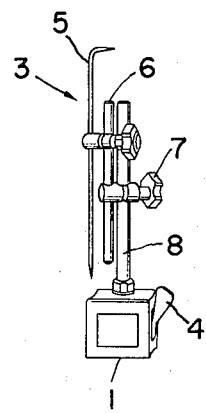
FIG. 1 is a perspective view showing a tool with one example of a magnet base according to the invention.

A machining auxiliary tool, namely, a marking-off tool 3 with one example of a magnet base 1 is as shown in FIG. 1, in which reference numeral 4 designates a handle which is turned through a predetermined angle to activate or inactivate the magnetic force of the magnet base; 5, a marking-off pin; 6, a supporting post; 7, knobs; and 8, a main post.

After the magnetic force of the magnet base 1 has been inactivated by turning the handle 4 as described later, the magnet base 1 is set on a surface table or a machine bench. The magnet base 1 thus set is fixedly secured thereto by turning the handle again to activate the magnetic force.

The specific features of the magnet base according to the invention will be described. As shown in FIG. 3, the magnet base 1 has a yoke 20 with a hole 10 into which a magnet 2 circular in section is slidably and rotatably inserted. The magnet 2 is in the form of a round bar and has the N pole and the S pole respectively on both sides of the chain line m. The yoke 20 of the magnet base 1 is made up of two magnetic metal parts 11 and 12 which are welded together with a metal layer, namely, a separator 13 of non-magnetic-permeable material interposed therebetween. A shallow V-shaped groove 22 is cut in the bottom of the magnet base 1, so that the magnet base can stably seat on a flat surface or a cylindrical surface.

A straight groove 14 is cut in one end face of the magnet 2 and along the diameter of the latter 2. On the other hand, a handle unit 15 comprising the abovedescribed handle 4 has a protrusion 16 in the form of a strip and a substrate 17 on which the protrusion 16 is formed. When the magnet 2 is inserted into the hole 10 of the yoke 20, the protrusion 16 is engaged with the straight groove 14. As the diameter of the substrate 17 is equal to the inside diameter of the hole 10 of the yoke 20, the substrate 17 is slidably fitted in the hole of the yoke 20 when assembled. The substrate 17 has a cut 18 which is brought into contact with the inner end of a stopper 19 as described later, so as to control the angle of rotation of the magnet 2.

The magnet base thus constructed is used as a base for a marking-off tool as shown in FIG. 1, or a dial gauge, for instance.

In operation, first the magnet 2 is set so that the N and S poles are orientated as shown in the part (a) of FIG. 2, i.e. the magnet 2 is placed in inactive (OFF) state. Under this condition, the bottom 21 of the yoke 20 is placed on a setting surface on which the magnet base should be set. Then, the handle unit 15 is turned through 90 degrees with its handle 4 so that the N and S poles of the magnet 2 is orientated as shown in the part (b) of FIG. 2, i.e. the magnet 2 is placed in active (ON) state. As a result, the magnet base is fixedly secured to the setting surface. When the magnet base is in the active state, its magnetic flux is extended outside the bottom 21 of the magnetic base 1 as shown in the part (b) of FIG. 2. Accordingly, when the magnet base thus set is placed on the setting surface, it is magnetically attracted by the setting surface. On the other hand, in the case where the magnet base 1 is placed in the inactive state, the magnetic flux is extended through the magnetic metal parts 11 and 12 of the yoke 20 as shown in the part (a) of FIG. 2. Accordingly, no magnetic force for attracting the magnet base 1 to an aimed surface is produced.

The magnet 2 is most stable when it is in the inactive state. If, when the magnet base is in the active state, for instance the handle unit 15 is struck by something, i.e. an external force is exerted on the magnet, then a force is caused which returns the state of the magnet as shown in the part (b) of FIG. 2 to that of the magnet as shown in the part (a) of FIG. 2. As a result, the magnet is turned by the magnetic force, and is finally set as shown in the part (a) of FIG. 2. However, when the magnet 2 is turned so that the groove 14 comes to the position indicated by the dotted line in the part (b) of FIG. 2, the cut 18 of the handle unit 15 abuts against the stopper 19 to stop the further rotation of the magnet 2. In addition, the torque of turning the magnet 2 is maintained. Therefore, even if an external force is carelessly exerted on the magnet to turn the latter in the opposite direction, the torque provides a force against the external force. Thus, the magnet 2 can be set stably in the active (ON) position as shown in the part (b) of FIG. 2.

The original function of the stopper 19 is to control the position of the magnet when the latter is placed in the inactive state. The end portion of the stopper 19 is abutted against the portion 18a of the cut 18 of the substrate 17 when the magnet base is in the inactive (OFF) state, and it is abutted against the portion 18b of the cut when the magnet base is in the active (ON) state.

The magnet 2 in the invention is larger in sectional area than the conventional magnet 2' (FIG. 4). Therefore, even if the magnet 2 is made of ferrite material, its magnetic flux low in density is compensated to increase its magnetic force. The use of ferrite material makes it possible to provide the magnet base at a low manufacturing cost. The magnet base thus manufactured is stable when it is placed in the active (ON) state.

In the above-described example of the magnet base, the magnet 2 is one solid unit. However, the magnet may be formed by bonding two pieces of magnet materials as shown in FIG. 5.

Furthermore, in the first example, the handle unit 15 has the protrusion 16 in the form of a strip, which is fitted in the groove 14 cut in the magnet. However, the handle unit 15 and the magnet 2 may be modified so that, as shown in FIG. 6, the substrate 17 has a recess 61 and the magnet 2 is cut by two parallel plane to form a protrusion 62 at one end which is fitted in the recess 61 of the substrate 17.

In the above-described first example of the invention, the magnet is made of ferrite material, and therefore its magnetic flux density is relatively low; however, its coercive force is still large. Accordingly, demagnetization of the magnet is not caused while the magnet base is switched on and off, even if the thickness of the separator 13 is larger. Thus, the thickness of the separator can be increased with the magnetic circuit formed when the magnet base is switched on being taken into consideration (FIG. 7). The increase of the thickness of the separator results in an increase of the dimensions of the N and S poles when the magnet is magnetized. This will improve the efficiency of the magnet base. Furthermore, the increase of the separator's thickness reduces the leakage of magnetic flux, i.e. increase the amount of magnetic flux in the setting surface for instance, of a surface table. As a result, the attraction force is greatly increased.

What is claimed is:

1. A magnet base for a tool comprising: a cylindrical ferrite magnet having N and S poles respectively on both sides of a plane including the central axis of said magnet; a yoke having a cylindrical hole in which said magnet is rotatably fitted, said yoke being made up of two parts which are respectively positioned on opposite sides of a plane in parallel with the central axis of said hole, said two parts being joined together with a non-magnetic-permeable metal material; and a handle unit engaged with said magnet, said handle unit having a handle on the outside thereof to turn said magnet, which magnet base comprises:

said cylindrical ferrite magnet having a sectional area substantially filling said cylindrical hole formed by said yoke;

said two parts of said yoke being fabricated from a magnetic metal material;

a stopper protruded from the inner surface of said cylindrical hole;

a cut formed in the peripheral portion of said handle unit in such a manner that said cut is engaged with said stopper as said handle unit turns;

said magnet base being placed in "off" state when said cut is engaged with said stopper by turning said handle unit in one direction, and said magnet base being placed in "on" state by turning said handle unit in the opposite direction to engage said cut with said stopper; wherein said stopper is so positioned that, when said cut is engaged with said stopper by turning said handle unit in said opposite direction, attraction takes place between said yoke and said magnet to push said cut against said stopper.

2. A magnet base as claimed in claim 1, in which said handle unit has a protrusion in the form of a strip on the inside thereof, and said magnet has a diametrically extended groove in one end face thereof, said protrusion being inserted into said groove of said magnet to form said handle unit and said magnet into one unit, whereby said magnet is turned by operating said handle unit.

3. A magnet base as claimed in claim 1, in which said magnet has a protrusion in the form of a strip on one end face thereof, and said handle unit has a diametrically extended groove in the inside thereof, said protrusion being inserted into said groove of said magnet to form said handle unit and said magnet into one unit, whereby said magnet is turned by operating said handle unit.

4. A magnet base as claimed in claim 1 in which said non-magnetic-permeable metal material is relatively large in thickness, whereby the leakage of magnetic flux of said magnet is decreased and accordingly the attraction force of said magnet is increased.

5. A magnet base as claimed in claim 2 in which said non-magnetic-permeable metal material is relatively large in thickness, whereby the leakage of magnetic flux of said magnet is decreased and accordingly the attraction force of said magnet is increased.

6. A magnetic base as claimed in claim 3 in which said non-magnetic-permeable metal material is relatively large in thickness, whereby the leakage of magnetic flux of said magnet is decreased and accordingly the attraction force of said magnet is increased.

* * * * *

UNITED STATES PATENT AND TRADEMARK OFFICE
CERTIFICATE OF CORRECTION

PATENT NO. : 4,393,363
DATED : July 12, 1983
INVENTOR(S) : Hiroshi Iwasaki

It is certified that error appears in the above—identified patent and that said Letters Patent is hereby corrected as shown below:

Col. 1, line 11, after "used" delete "with".

Col. 2, lines 61, 62, change "abovedescribed" to --above-described--

Col. 4, lin 4, change "plane" to --planes--.

First page of patent [73] Assignee; change "Fuju" to --Fuji--.

Signed and Sealed this

Eleventh Day of October 1983

[SEAL]

*Attest:*

*Attesting Officer*

GERALD J. MOSSINGHOFF

*Commissioner of Patents and Trademarks*